United States Patent [19]

Lösel

[11] Patent Number: 4,816,821
[45] Date of Patent: Mar. 28, 1989

[54] CLOCKED DIRECT VOLTAGE CONVERTER

[75] Inventor: Walter Lösel, Fürth, Fed. Rep. of Germany

[73] Assignee: U.S. Philips Corp., New York, N.Y.

[21] Appl. No.: 100,644

[22] Filed: Sep. 24, 1987

[30] Foreign Application Priority Data

Oct. 2, 1986 [DE] Fed. Rep. of Germany ....... 3633518

[51] Int. Cl.$^4$ .............................................. G05F 1/613
[52] U.S. Cl. ...................................... 323/284; 363/80
[58] Field of Search ....................... 363/79, 80, 85, 86, 363/89, 124, 126; 323/282, 284, 285, 267

[56] References Cited

U.S. PATENT DOCUMENTS 4,275,436  6/1981  Peterson ............................. 363/126

FOREIGN PATENT DOCUMENTS 0048934   4/1982   European Pat. Off. .
0127621  10/1980   Japan .................................. 323/284
2157859  10/1985   United Kingdom ................ 323/284

Primary Examiner—Peter S. Wong
Attorney, Agent, or Firm—Bernard Franzblau

[57] ABSTRACT

A clocked direct voltage converter has a controlled output at which a controlled voltage is produced. The converter also produces an uncontrolled voltage at an uncontrolled output. The latter voltage, is obtained by coupling to one of the energy storage elements in the converter. In order to avoid the "idling" mode of operation in such a clocked direct voltage converter, a threshold value detector is provided which connects, through a switch, a base load to the controlled output when the uncontrolled voltage output falls below a given threshold.

7 Claims, 1 Drawing Sheet

CLOCKED DIRECT VOLTAGE CONVERTER

BACKGROUND OF THE INVENTION

This invention relates to a clocked direct voltage converter in which the voltage at an output is controlled and an uncontrolled voltage is produced by coupling to an inductive storage element of the converter.

A direct voltage converter having these features is described, for example, in Published European Patent Specification No. 0 048 934. The direct voltage converter described therein concerns down converters with potential separation. The transformer which also serves as the inductive storage element, comprises a secondary circuit in which the voltage for the load is not controlled, but is "pulled along" by another controlled secondary circuit. In general, such uncontrolled connections, which may be provided with a simple succeeding series regulator, are used for feeding active elements of the control device of the converter.

In clocked direct voltage converters provided with a control device, with a small load the so-called "idling" operation can occur, which is characterized in that the currents through inductive storage elements of the converter temporarily become equal to zero. In the "idling" operation, only a small quantity of energy is transmitted from the primary side to the secondary side of the converter. This means inter alia that the part of the time of a period of the switching clock for which the switching transistor of the converter is conducting is made extremely small, or even equal to zero, by the control device of the converter. However, since the switching transistors because of their parasitic capacitances either cannot beome conductive at all or can become conductive for a minimum amount of time (this minimum amount of time lies for bipolar transistors at 200 ns and for MOS FET's at 100 ns), the following disadvantages ensue therefrom for the "idling" operation:

If the control device does not render the switching transistor conductive at all for one or several clock periods, the switching processes obtain another frequency spectrum; considerably lower frequencies than in normal operation occur in this case. Therefore, the low-pass filters at the converter input, which should protect the supply mains, to which the converter is connected, from interferences, no longer fulfil their function. Moreover, if, for example, the switching frequency lies at 20 kHz in normal operation, the switching process can become audible. When the switching transistor is opened, the voltage at the controlled output exceeds - because of the excessively large minimum amount of time - its nominal value to a considerably greater extent than in normal operation. Therefore, the voltage fluctuations are considerably larger in the "idling" operation than in normal operation.

Because of these disadvantages, operation of the converter in the "idling" mode should be avoided as far as possible. According to DE PS No. 2359555, the "idling" operation is avoided in the case of down converters in that a base load, i.e. a resistor, is connected parallel to the so-called flywheel diode of the down converter by means of a switch, which is operated in pushpull arrangement with the switching transistors.

SUMMARY OF THE INVENTION

An object of the invention is to avoid the "idling" mode of operation by connecting a base load for all types of converters having the features mentioned in the opening paragraph.

This object is achieved in that a threshold value detector connects, through a switch, a base load to the output at which the controlled voltage appears if the uncontrolled voltage falls below a given threshold.

Advantageous embodiments of the invention are indicated in the claims.

BRIEF DESCRIPTION OF THE DRAWINGS

In order that the invention may be readily carried out, it will now be described more fully with reference to the drawing and to two embodiments.

In the drawing.

DESCRIPTION OF THE PREFERRED EMBODIMENTS

Figure 1:
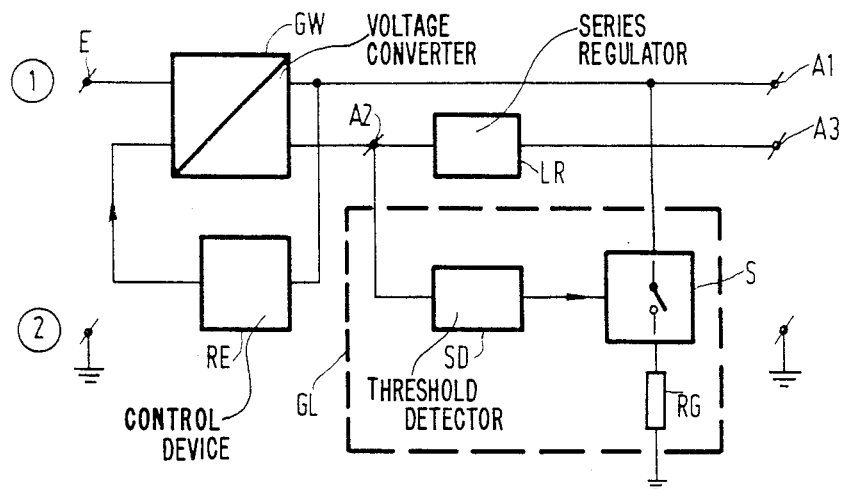
FIG. 1 shows the principle circuit diagram of a direct voltage converter having features according to the invention.

In the example shown in FIG. 1—a principle circuit diagram—an uncontrolled voltage is applied to the input E of a direct voltage converter GW which, except for a switching transistor, comprises only passive elements. Only one terminal of the input E is shown; the second terminal (not shown) is coupled to reference potential. The same applies to all of the remaining inputs and outputs, which are indicated below. The direct voltage converter GW may be a down converter, a fly-back converter or a push-pull converter. The voltage at the output A1 of the converter is adjusted to its nominal value by a control device RE in that the switching-on and switching-off times of the switching transistor (not shown) are varied on the primary side of the direct voltage converter GW. The converter derives in normal operation from a supply mains in the rhythm of the switching frequency amounts of energy, which are temporarily stored in inductive storage elements—i.e. in chokes or transformers—and are then transmitted through output capacitors to the output A1 of the load.

The voltage at the second output A2 of the direct voltage converter GW is not controlled. In the case of this output, an output is concerned, which is "pulled along" and is inductively coupled to an inductive storage element of the direct voltage converter GW, i.e. is fed by a winding, which in the case of an inductive storage element is wound onto the same core. In the case of a down converter with mains separation, the output A2 is fed either via a separate secondary winding of the separation transformer, or via a winding which is coupled to the storage choke of the converter. The voltage at the output A2 "pulled along" is readjusted in the circuit arrangement shown in FIG. 1 by a series regulator LR. The voltage at the input side of the series regulator LR is used for supplying active elements of the direct voltage converter GW.

In order to avoid the "idling" operation of the direct voltage converter GW, a unit designated as base load regulator GL is provided. It comprises a threshold value detector SD having its input connected to the uncontrolled output A2 of the converter GW. The output signal of the threshold value detector SD drives a controllable switch S, which—when it is in the conductive state—interconnects the terminals of the output A1 through an ohmic resistor RG (base load).

The resistor RG is proportioned so that, when the switch S is closed (conductive state), the "idling" operation of the converter GW is prevented with certainty.

The criterion for the occurrence of the "idling" operation is the breakdown of the voltage at the uncontrolled output A2 of the converter. The output A2 is always (at least slightly) loaded so that any smoothing capacitors are rapidly discharged if they are not sufficiently recharged. In the "idling" mode of operation, the sufficient recharge is not possible because due to the currents becoming equal to zero in the inductive storage elements, temporarily no induction voltage at all occurs at the ends of the winding which feeds the output A2.

In the example shown in FIG. 1, the base load regulator GL also becomes active even if the controlled output A1 is slightly loaded and the voltage at the output A2 breaks down due to additional load at the output A3 of the series regulator LR. After the base load RG is connected, the voltage at the output A2 and hence also the voltage at the output A3 of the series regulator LR increase to their initial value.

Figure 2:
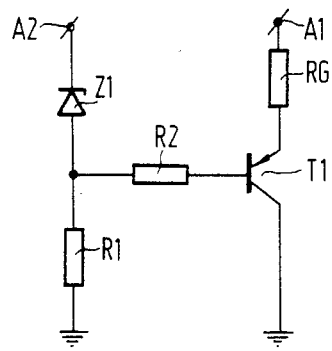
FIG. 2 shows a first embodiment of an arrangement for connecting a base load.

FIG. 2 shows an embodiment of the base load regulator GL as shown in FIG. 1. The terminals of the output A2 are interconnected through the series-combination of the Zener diode Z1 and of a resistor R1. The case is assumed in which the terminals of all the inputs and outputs not applied to reference potential are applied to a higher potential. The junction point—at the same time the anode of the Zener diode Z1—of diode Z1 and resistor R1 is connected through a base resistor R2 to the base of a PNP transistor T1. Its collector is connected to the reference potential and its emitter resistor is the base load RG. The series-combination of the resistor RG and the collector-emitter path of the transistor T1 interconnects the two terminals of the controlled output A1.

When the voltage at the output A2 falls below the threshold fixed by the Zener diode Z1, the base of the transistor T1 is applied to reference potential and the transistor is then opened. The base load RG is then connected to the output A1. When the voltage at the output A2 increases again, the transistor is cut off and the base load is then separated from the output A1.

Figure 3:
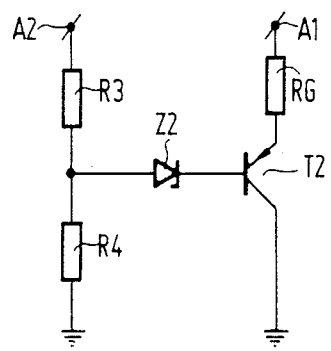
FIG. 3 shows a second embodiment of an arrangement for connecting a base load.

A variation of the base load regulator GL shown in FIG. 2 is shown in FIG. 3. The series arrangement of the base load RG and the collector-emitter path of a PNP transistor T2 again interconnects the two terminals of the controlled output A1. The base of the transistor is connected through a Zener diode Z2 to the centre tapping on an ohmic voltage divider R3,R4, which is arranged between the terminals of the output A2. The diode Z2 is polarized so that its cathode is connected to the base of the transistor T2. When the voltage at the output A2 falls below a threshold fixed by the diode Z2, the diode Z2 becomes conductive and the base of the transistor T2 is applied to reference potential. Thus, the transistor T2 is also conductive and the base load RG is active. At high voltages at the output A2, the transistor T2 is cut off and the base load RG is inactive.

What is claimed is:

1. A clocked direct voltage converter comprising: an input terminal for connection to a source of voltage, a first output terminal at which is developed a controlled output voltage for a load, a second output terminal at which an uncontrolled voltage is developed by coupling to an inductor storage element in the converter, means connecting a controlled semiconductor switch and a base load resistor in series circuit between said first output terminal and a point of reference voltage, and a voltage threshold detector coupled to said second output terminal and to a control electrode of the semiconductor switch for selectively controlling the semiconductor switch into conduction when the uncontrolled voltage at the second output terminal drops below a threshold voltage value thereby to couple said base load resistor to said first output terminal.

2. A clocked direct voltage converter as claimed in claim 1 wherein the threshold detector comprises a series-combination of a Zener diode and a first resistor connected between said second output terminal and said point of reference voltage, said semiconductor switch comprising a transistor with its collector-emitter path connected in series with the base load resistor between the first output terminal and said point of reference voltage, and means connecting a junction point of the Zener diode and the first resistor to the base of said transistor via a second resistor.

3. A clocked direct voltage converter as claimed in claim 1 wherein said semiconductor switch comprises a transistor with its collector-emitter path connected in series with the base load resistor between the first output terminal and said point of reference voltage, and the threshold detector comprises a voltage divider connected between the second output terminal and said point of reference voltage, and a Zener diode coupling a tap point on the voltage divider to the base of the transistor.

4. A clocked direct voltage converter as claimed in claim 1 wherein the threshold detector comprises only passive operating circuit elements.

5. A clocked direct voltage converter as claimed in claim 1 further comprising a feedback control device coupled between said first output terminal and a primary side of the direct voltage converter for adjusting the switching periods of a switching transistor connected on said primary side of the converter and in a sense to maintain the controlled voltage developed at said first output terminal at a nominal value.

6. A clocked direct voltage converter as claimed in claim 1 further comprising a series regulator connected between said second output terminal and a further output terminal.

7. A clocked direct voltage converter as claimed in claim 1 wherein the threshold detector comprises a circuit with a single input connected only to said second output terminal whereby the threshold detector operates independently of the controlled voltage at the first output terminal.

* * * * *